United States Patent [19]
Oshikawa

[11] Patent Number: 5,898,472
[45] Date of Patent: Apr. 27, 1999

[54] AUTOMATIC EYEWEAR STRAP WINDING DEVICE

[76] Inventor: Hidetoshi Oshikawa, Sunnywell 20, 5-13-2 Kyuden, Setagaya-ku, Tokyo, Japan

[21] Appl. No.: 08/893,580

[22] Filed: Jul. 11, 1997

[51] Int. Cl.[6] ........................................................ G02C 3/00
[52] U.S. Cl. ............................................ 351/156; 351/157
[58] Field of Search ..................................... 351/156, 157; 2/452

[56] References Cited

U.S. PATENT DOCUMENTS 5,488,441   1/1996   Pomatti ..................................... 351/156

*Primary Examiner*—Huy Mai
*Attorney, Agent, or Firm*—Browdy and Neimark

[57] ABSTRACT

An eyeglass holding device (7) has a strap (4') with a clip for attaching the strap end to an eyeglass frame (1'). The strap feeds in and out of a housing (8) which contains reel (14) on which the cord winds. The housing is detachably mounted on a hat or shirt for example with VELCRO. The strap winding mechanism inside the housing includes a torsion spring (21) for retracting the strap back into the housing; a rachet (18) and pawl (17) acting as lock to stop the spring from pulling the strap in once it is pulled out; and a button (16) to release the lock. The eyeglasses can be pulled to bring out any length of the straps. The torsion spring retracts the cords while the button is pressed.

11 Claims, 5 Drawing Sheets

PRIOR ART

AUTOMATIC EYEWEAR STRAP WINDING DEVICE

FIELD OF THE INVENTION

The present invention relates to devices which allow eyewear, such as eyeglasses or sunglasses, to be worn in a set position on head gear such as a cap, or, to hang down on the chest.

REVIEW OF THE RELATED TECHNOLOGY

Many people wear prescription eyeglasses. Healthy people, who are either near-sighted nor far-sighted, frequently wear sunglasses or goggles either for sports or for fashion purposes.

Eyewear may be kept in a pocket or handbag. It is also common to see people carrying their glasses hanging down on their chests, as shown in FIG. 14, by means of a strap 4 with clips 3 at either end attached to the frame 1' of the glasses 1. The strap is passed around the neck 6 at the collar 5' of the clothes 5.

It is also common for people to wear glasses in their hair, from which position they can easily be moved onto the face. Glasses worn in the hair can be considered a fashion item.

Carrying eyewear in a pocket or handbag has the disadvantage that people frequently forget where they have placed their glasses and are unable to reach them when necessary. Such carrying also causes breakage and loss. The glasses may be accidently dropped upon taking them out of the pocket or handbag.

Although hanging eyeglasses from the neck as shown in FIG. 14 is quite convenient, the straps sway and are a hindrance to movement. When engaging in sports or otherwise intense movements, the glasses hanging from the neck as shown in FIG. 14 sway with each movement of the body. Moreover, the glass can break and cause injury if one should accidentally fall down.

Furthermore, since the strap 4 is highly visible, a person may wish to change the color of the strap for fashion purposes. However, changing the strap in order to change the strap color is a troublesome process.

SUMMARY OF THE INVENTION

Accordingly, the present invention has an object, among others, to overcome deficiencies in the prior art such as noted above.

The present invention provides an automatic eyewear holding strap winding mechanism. Like a conventional neck strap it permits carrying glasses by hanging them around the neck, but it also allows setting and resetting of the eyeglasses on the face to be performed with a single touch. It causes little or no hindrance during activities such as sports. It is fashionable, highly durable, can be produced at low cost, and its operation can easily be controlled automatically. The invention may be used as a hunting hat, sun visor, or and other type of head gear.

BRIEF DESCRIPTION OF THE DRAWING

The above and other objects and the nature and advantages of the present invention will become more apparent from the following detailed description of embodiments taken in conjunction with drawings, wherein.

DETAILED DESCRIPTION OF THE PREFERRED EMBODIMENTS

Figure 1:
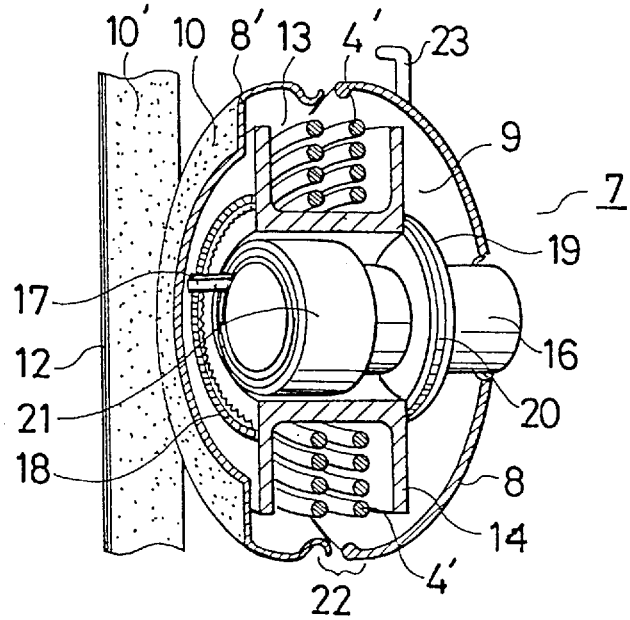
FIG. 1 is a perspective cutaway view of a first embodiment of the invention.
Figure 2:
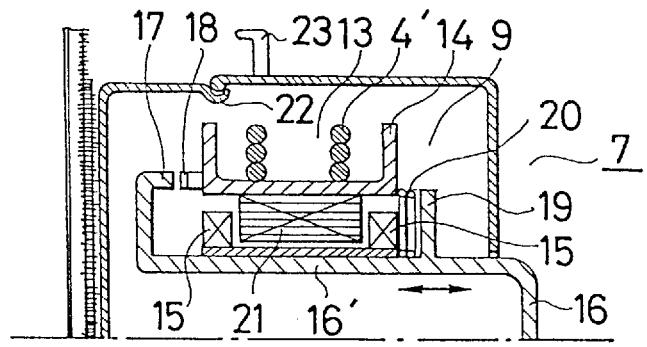
FIG. 2 is a cross-sectional view of the first embodiment of the invention.
Figure 3:
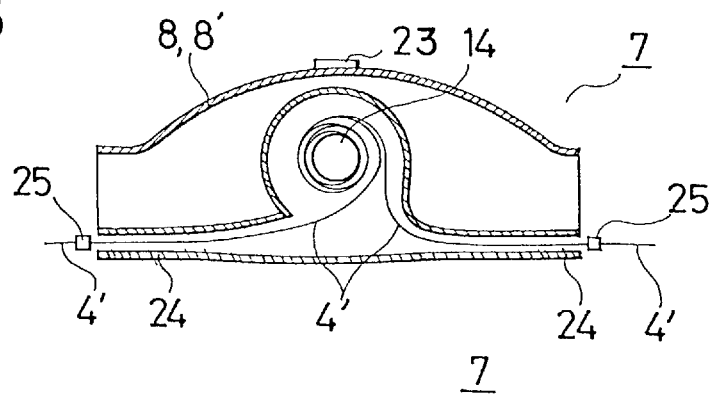
FIG. 3 is a cross-sectional view of a second embodiment of the invention.

FIGS. 1–2 show the winding or rewinding mechanism of the invention. FIG. 3 shows a sectional view of the winding device of the present invention and FIGS. 4–7 its use on a cap 11.

Numeral 7 indicates the automatic eyewear strap 1 device of the invention, embodied as a single-unit type in FIGS. 1–7. The automatic winding device 7 generally includes exterior cap-type cases, a front case 8 and rear case 8', and an interior magazine 9. The rear case 8' has attached thereto a round hook-and-loop (e.g., VELCRO) fastener 10 of appropriate size. The VELCRO fastener 10 used as a mount. It attaches to a second VELCRO fastener 10' fixed to the cap 11 by adhesive.

Inside the magazine 9 is a reel 14 with a single winding groove 13. A pair of circular cross-sectional eyeglass straps 4', 4' are attached to the reel 14. One of the straps is for the left side and one is for the right side. The reel 14 is mounted on bearings 15 so as to rotate freely in both directions when released by a release button 16 of the shank 16'. The rear of the shank 16' includes a pawl 17 which acts as a stopper to prevent reel 14 from moving when the pawl 17 engages a circular ratchet track 18 on the rear interior of the reel 14.

Integrated with the exterior edge of the shank 16' is a flange 19. The compression spring 20, for relative slip rewinding, is installed between the flange 19 and the reel 14. A coil retractor spring 21 has one end attached to the reel 14 and the other end attached to the shank 16' of release button 16. The coil spring 21 winds as the reel 14 is rewound.

The ratchet 18 and pawl 17 hold the reel 14 from rotating after it has been wound against the force of the spring 21 by drawing out the straps 4'. The ratchet 18 and pawl 17 are held in engagement by the spring 20. When the button 16 is pushed the force of the spring 20 is overcome and the ratchet 18 and pawl 17 are disengaged; then the torsion of the spring 21 is released, and the straps 4' are rewound and drawn into the device 7. Thus the ratchet 18 and pawl 17 constitute a lock and the button 16 a lock release.

The ratchet 18 and pawl 17 may include ramp-shaped teeth, a spring-urged tooth, and other conventional arrangements permitting one-way motion.

Preferably, the torsion spring 21 is substantially in equilibrium when the strap 4' is wound more-or-less completely about the reel 14, so that the strap is inside the housing (magazine 9 and/or case 8, 8'). Pulling the strap 4' out of the housing then winds up the torsion spring so that the winding mechanism is able to retract the strap 4' back inside the housing.

The joint of the case 8 includes a male/female type clip 22. The outside of the case 8 has a integrated hand operated hook 23.

To attach the automatic eyewear strap winding device 7 of the invention to a particular location on cap 11, the VELCRO fastener 10' is a fixed in advance to a predetermined particular location using a adhesive 12. The VELCRO fastener 10' is then attached to the other VELCRO fastener 10 fixed to the rear of the case 8.

The reel 14, to which are attached the straps 4', is wound a certain number of times while turning the coil spring 21, which is a torsion spring. Then the pawl 17 locks the ratchet rack 18 to hold the magazine 9 in a fixed position. The magazine 9 freely winds by means of bearings 15 when the release button 16 is pressed.

The ratchet rack 18 and/or the pawl 17 may include ramp-shaped teeth with one side inclined, so that the reel 14 is able to be turned to withdraw the strap 4' without pressing the button 16 to disengage the ratchet 18 and pawl 17 teeth.

FIG. 3 shows an embodiment in which the interior and exterior cases 8 and 8' have guide holes 24 at both ends. The straps 4' extend to left and right of the reel 14 and include respective stoppers 25 outside of the guide holes. Each strap 4' is attached solidly to the frame 1' (e.g., side or ear pieces) of the sunglasses frame 1' one by means of clips 26.

Figure 12:
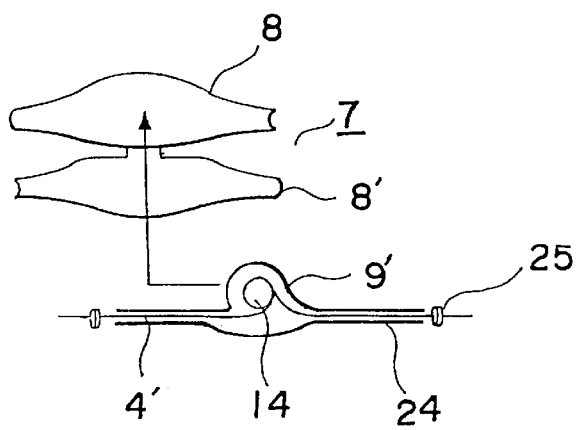
FIG. 12 is an exploded view of the second embodiment of the invention.

This embodiment is also shown in FIG. 12.

The clips 26 are fitted onto the straps 4' at the optimum length for use when sunglasses are placed on the face.

It is possible to adjust the position of the automatic eyewear strap winding mechanism 7 for different ways of wearing the cap by adjusting the VELCRO fastener 10, 10'.

The sunglasses 1 may be set above the visor 11' of the cap 11 in a fixed position by grasping the frames 1' with both hands. The straps 4', which are attached to the ear pieces 1' by clips 26, cause the reel 14 to rotate around the outside of the release button 16, with resistance being provided from the coil spring 21 as the straps are drawn out. When the glasses are placed in a set position the pawl 17 stops the ratchet rack 18, and the sunglasses stay in the fixed position on the visor 11' of the cap 11 without shortening of the straps 4'. Although, the wearer can freely move the glasses, there is absolutely no chance of dropping. the sunglasses.

Figure 4:
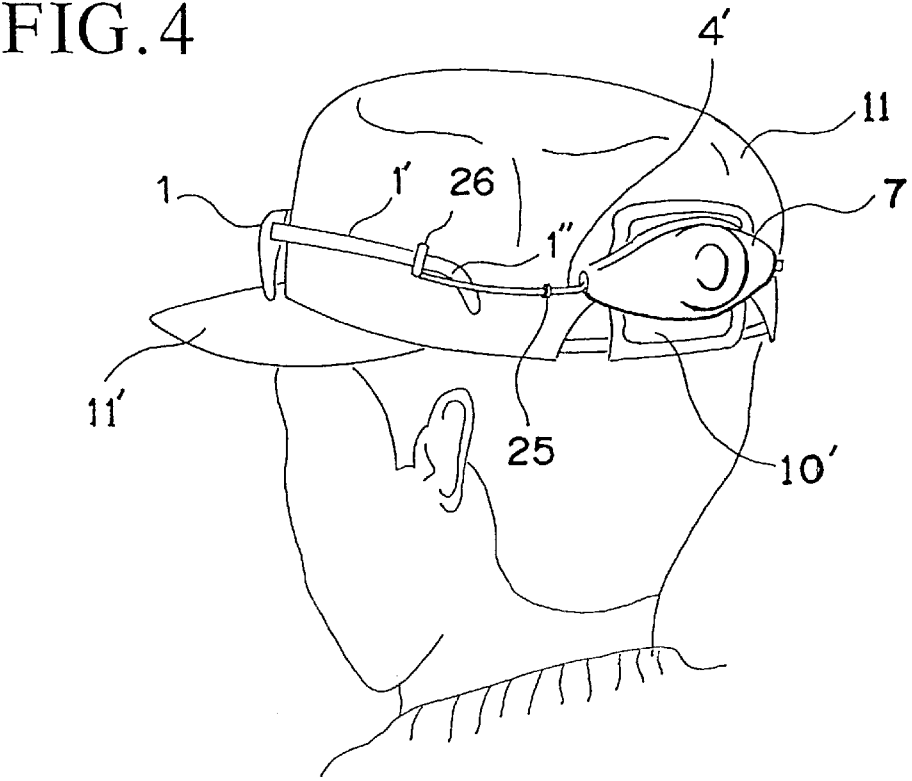
FIGS. 4 through 7 are environmental perspective views of the second embodiment, of the invention.
Figure 5:
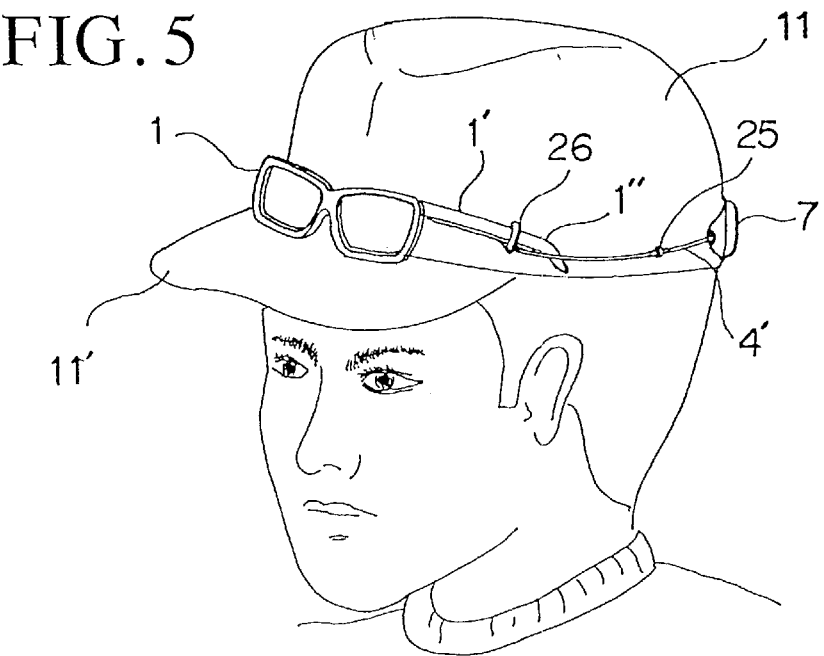

The fixed position of the sunglasses 1 on the visor 11' of the cap 11 is shown in FIGS. 4 and 5.

Figure 6:
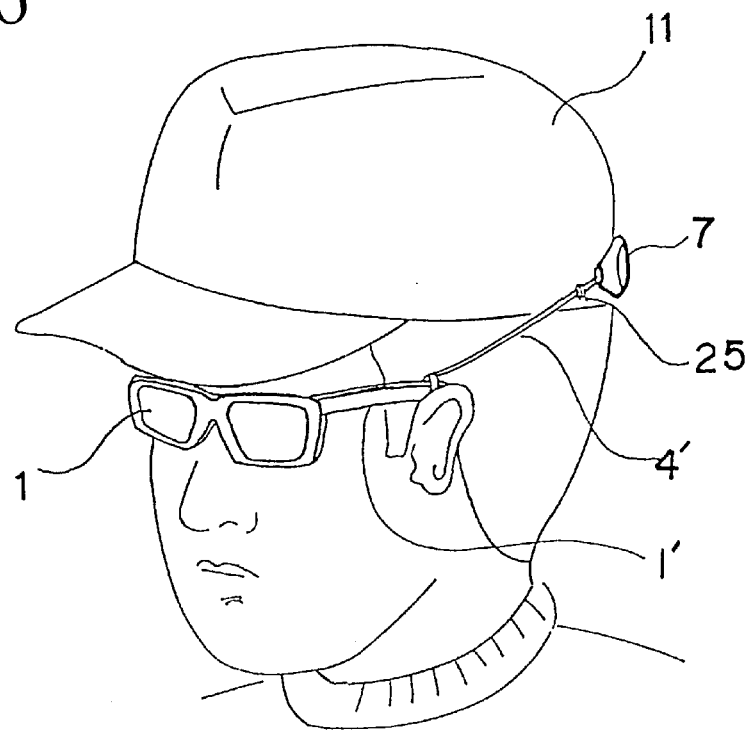

FIG. 6 shows how the sunglasses 1 are placed on the face in their normal position by pulling the sunglasses 1 forward by grasping the frames 1' with both hands. This pulls the straps 4', causing the reel 14 to rotate against the resistance of the coil spring 21. When the sunglasses 1 are placed on the face, pressing the release button 16 of the automatic eyewear strap winding device 7 with one hand separates the pawl 17 from the ratchet rack 18 and rotates the reel 14 in the opposite direction, due to the force of the coil spring 21, so that the straps 4' are drawn in and wound on the reel 14. The stoppers 25 prevent the mechanism from pulling on the straps beyond the set position of the sunglasses 1. When pressure is removed from the release button 16, the pawl 17 stops the ratchet rack 18 and the sunglasses are maintained in a fixed position.

Thus, the eyeglasses 1 and the automatic strap winding device 7 are connected in such a manner that they pull on one another. Because of this, when the wearer engages in skiing or other sports he can move freely without the sunglasses coming off. Even if the sunglasses 1 come off, there is no chance of accidental dropping since the straps 4' are connected to the automatic strap winding device 7.

Figure 7:
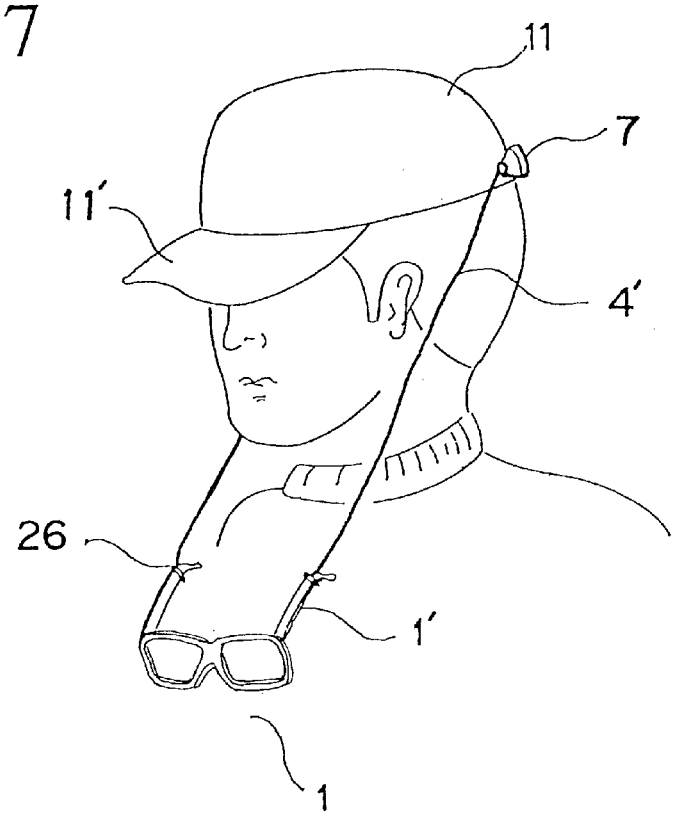

FIG. 7 shows the eyeglasses hanging down on the chest. This position is achieved by grasping the frame 1' of the sunglasses 1 and pulling diagonally down into the front. The straps 4' cause the reel 14 to rotate in the normal direction, i.e., with resistance from the coil spring 21.

When carrying the eyewear but not engaging in sports, the user may grasp the frame 1' of the sunglasses 1 with the hands and pull them diagonally down and to the front. The straps 4' cause the reel 14 to rotate in the normal direction (with resistance from the coil spring 21) and the straps 4' are withdrawn in one complete stroke to hang down on the chest as shown in FIG. 7.

If the straps 4' are made of inelastic tape the hanging position of the glasses does not change due to stretching of the flat cord. This prevents the tape from swaying.

The sunglasses may be returned to the position shown in FIG. 4 or FIG. 5 i.e., set above the visor 11' of the cap 11, or to the wearing position on the face as shown in FIG. 6, by pressing the release button 16 with one hand. Pressing the release button 16 releases the pawl 17 from the ratchet rack 18 and the reel 14 rotates in the opposite direction as a result of the force imparted by the coil spring 21, so that the straps 4' are shortened. By setting the sunglasses 1 in position with one or both hands and releasing the pressure from the release button 16, the pawl 17 stops the ratchet rack 18 and the sunglasses 1 are held in a fixed position as described above.

Figure 8:
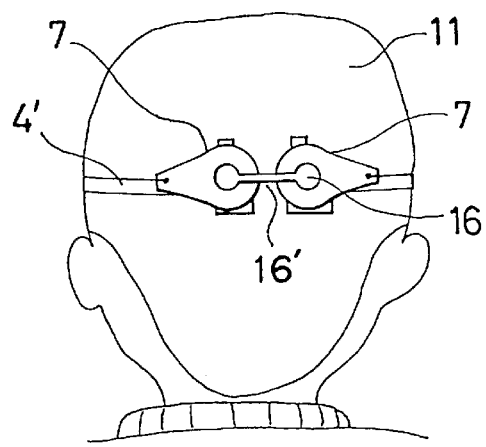
FIG. 8 is a perspective environmental view of a third embodiment of the invention.

FIG. 8 shows a twin-unit type automatic eyewear strap winding device which incorporates a pair of the automatic eyewear strap winding devices 7 which are shown in FIGS. 1–3. Each of the winding devices 7 includes a guide hole and can release or drawn a strap 4', one on the left and one on the right. In this embodiment, the release button 16 are connected by a tie rod 16'. Both the left and right straps 4' can be pulled out independently, which makes it possible to use the sunglasses 1 in positions where the balance of the left and right straps is uneven. Operating the tie rod 16', with a single hand, the reels 14 in either magazine rotate simultaneously in opposite directions, drawing in the straps.

Figure 10:
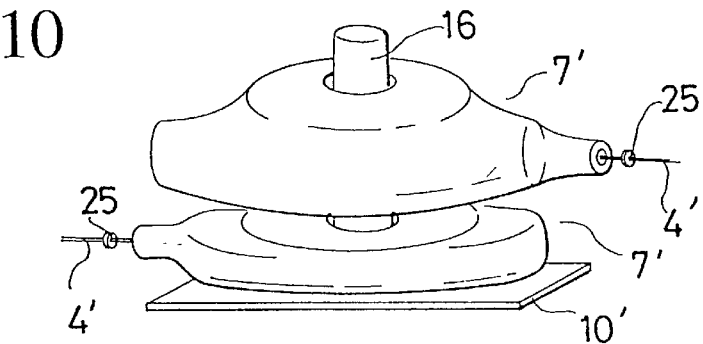
FIG. 10 is a partial perspective view of a fourth embodiment of the invention.

FIG. 10 also shows a twin type embodiment in which the automatic eyewear strap winding devices 7 and 7' are placed on top of one another. This embodiment also allows the lengths of the strap 4' to be adjusted independently so that the sunglasses 1 can be used in a position where the balance of left and right straps is not even, as described above.

Figure 9:
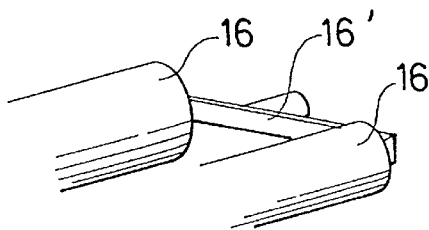
FIG. 9 is a detailed perspective view of the third embodiment of the invention.
Figure 11:
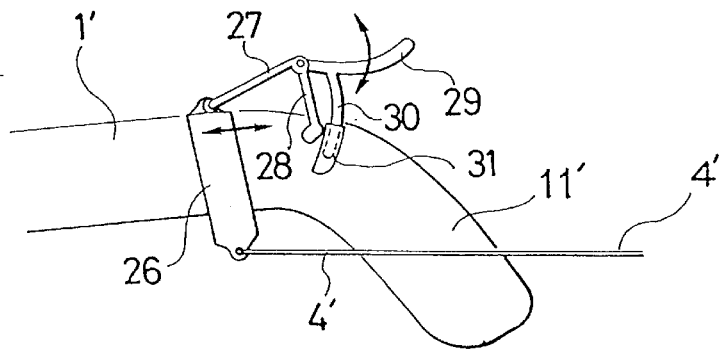
FIG. 11 is a detailed views of the strap end of the invention.

FIG. 11 shows clips 26 on the frame 1' of sunglasses 1, which further guarantee that the length of the strap 4 can be adjusted or securely clamp in position. A curved lever 27 on a top portion of clip 26 is supported by link 28 attached to the end of the bow 11' of frame 1'. The handle bar 29 includes a stopper 30 which is insertable into a pocket 31 in the bow 11' of the frame 1'. The length of strap 4' drawn in by the coil spring 21 is controlled by a stopper 25. By turning the handle bar 29 of the lever 27 in the direction of the bow 11' with one hand, the action of link 28 causes the bow 11' and the clip 26 to draw closer to one another, so that the sunglasses are set in a closer position. Since the stopper 30 is set in the pocket 31 the position is fixed quite solidly. The fine-adjustment mechanism for working the stopper shown in FIG. 11 can be used not only with the single type winding device shown in FIGS. 1–7 but also with the twin types shown in FIGS. 8–10.

As mentioned above, when the glasses are worn in a hanging position they can be considered an item of fashion. To fulfill a fashion need for different colors, the cap 8, 8' can be opened and the magazine cassette 9,' which is attached to the straps 4' can be replaced. The straps 4' can be made in a variety of colors and sizes, so changing the magazine cassette 9' allows different colors to be worn.

Figure 13:
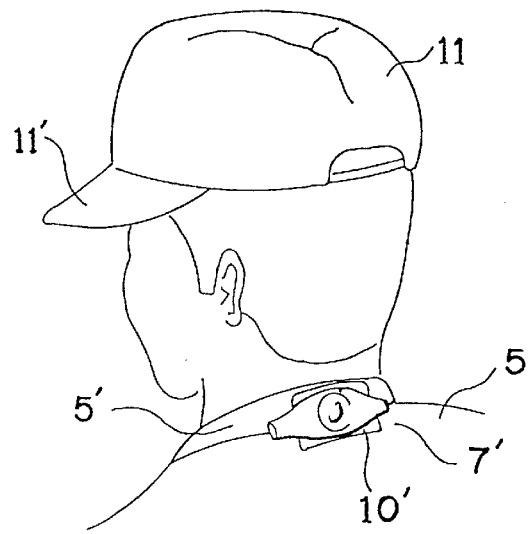
FIG. 13 is a perspective environmental view of the second embodiment of the invention.
Figure 14:
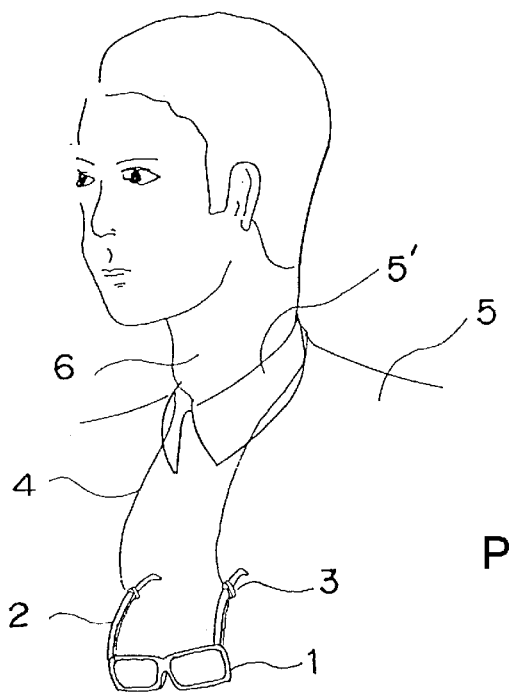
FIG. 14, labeled "prior art", is a perspective view of a conventional strap for eyeglasses.

FIG. 13 shows an automatic eyewear strap winding device 7' according to the invention fixed to a collar 5' of a shirt 5 by means a VELCRO fastener 10' attached in advance to a designated position with adhesive 12. The case 8' has a mating VELCRO fastener 10. This allows the sunglasses to be worn on the face or in a hanging position.

The present invention is not limited to those methods of uses described above. For example, the cap can be replaced by a hunting hat, sun visor or a head gear. Furthermore, the mounting medium is not limited to head gear and clothing but can also includes accessories such as mufflers, scarfs, or earmuffs. The eyewear that can be used with the invention is not limited to sunglasses but may also include goggles, prescription eyeglasses, and loupes.

One possible modification of the invention is to place a micromotor and battery on the head gear as a power source and to operate the device through electrical power.

It is possible to pull the glasses over head and hang them on back, for example when carrying large items. An additional modification is to decrease the difference between the coefficients of dynamic and static friction between the stopper 25 and the strap 4. This would allow the length of the strap 4' withdrawn from the magazine 9' to be controlled automatically according to the elasticity of the straps.

Rubber, or other material of specific elasticity, may bemused for the straps.

The present invention makes its possible to hang sunglasses 1 or other eyewear from the neck and by means of the straps 4', and, by placing the automatic eyewear strap winding device 7 on the rear of a hat or other item to used as a mounting medium, to have the straps 4' automatically lengthen or shorten to place the eyewear above the visor of a cap 11 or on the face for use. Furthermore, its possible to hang the glasses 1 from the neck on the chest; because the eyewear is attached to the winding device 7 by means of straps 4', the glasses cannot be dropped or lost and therefore there is freedom of movement during sports or other activities, and fashion can be maintained.

In addition, since the magazine is fixed to the mounting medium by an attachment such as VELCRO or a hook it can be easily removed. This also increases the ease and freedom of wearing glasses. Since the glasses can be worn in any position desired, fashion is maintained.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention. Thus the expressions "means to . . . " and "means for . . . " as may be found in the specification above and/or in the claims below, followed by a functional statement, are intended to define and cover whatever structural, physical, chemical or electrical element or structure may now or in the future exist for carrying out the recited function, whether or not precisely equivalent to the embodiment or embodiments disclosed in the specification above; and it is intended that such expressions be given their broadest interpretation.

what is claimed is:

1. An eyeglass holding device (7) comprising:

a strap (4') including an eyeglass frame (1') attachment at one end thereof;

a housing (8);

a detachable mount for attaching the housing to an article of clothing; and a winding mechanism, disposed within the housing, for drawing into and releasing the strap from the housing, the winding mechanism including a retractor for pulling the strap into the housing, a lock for stopping motion of the strap into the housing, and a manual lock release permitting retraction of the strap into the housing.

2. The holding device according to claim 1, wherein the winding mechanism comprises a magazine (9) removable from the housing.

3. The holding device according to claim 1, wherein the housing includes two separable cases (8, 8').

4. The holding device according to claim 1, wherein the detachable mount includes a first mount attached to the article of clothing and a second mount attached to the housing.

5. The holding device according to claim 4, wherein the first mount and the second mount include hook material and loop material.

6. The holding device according to claim 1, wherein the eyeglass frame attachment includes a clip (26) attachable to an eyeglass frame (1').

7. The holding device according to claim 6, wherein the clip (26) includes a curved lever (27) disposed on a top portion of the clip and supported by a link (28) attached to an end of a bow (11') of the frame (1'), a handle bar (29) pivotably coupled to the lever (27) and including a stopper (30) insertable into a pocket (31) in the bow (11') of the frame (1');

whereby turning the handle bar in a direction of the bow causes the bow and the clip to draw closer to one another and the stopper (30) to be set into the pocket (31).

8. The holding device according to claim 1, wherein the winding mechanism comprises a reel (14) on which the strap is wound by rotation of the reel about a shank (16') on which the reel is rotatably mounted (15).

9. The holding device according to claim 8, wherein the retractor comprises a torsion spring (21) coupled between the shank and the reel.

10. The holding device according to claim 9, wherein the torsion spring is substantially in equilibrium when the strap is wound about the reel such that the strap is generally contained within the winding mechanism, whereby the torsion spring exerts a retracting force when the strap is extended outside of the reel.

11. The holding device according to claim 8, wherein the lock comprises a ratchet and a pawl.

* * * * *